US012784285B2

(12) United States Patent
Zhang et al.

(10) Patent No.: US 12,784,285 B2
(45) Date of Patent: Nov. 3, 2026

(54) METHOD OF ENCODING AND DECODING, ENCODER, AND DECODER

(71) Applicants: Beijing Xiaomi Mobile Software Co., Ltd., Beijing (CN); Xidian University, Xi'an (CN)

(72) Inventors: Wei Zhang, Shaanxi (CN); Mary-Luc Georges Henry Champel, Beijing (CN); Shuo Gao, Beijing (CN)

(73) Assignees: Beijing Xiaomi Mobile Software Co., Ltd., Beijing (CN); Xidian University, Xi'an (CN)

( * ) Notice: Subject to any disclaimer, the term of this patent is extended or adjusted under 35 U.S.C. 154(b) by 276 days.

(21) Appl. No.: 18/697,760

(22) PCT Filed: Nov. 4, 2021

(86) PCT No.: PCT/CN2021/128801
§ 371 (c)(1),
(2) Date: Apr. 2, 2024

(87) PCT Pub. No.: WO2023/056677
PCT Pub. Date: Apr. 13, 2023

(65) Prior Publication Data

US 2024/0404118 A1 Dec. 5, 2024

(30) Foreign Application Priority Data

Jun. 10, 2021 (WO) .................. PCT/IB2021/059162

(51) Int. Cl.
*G06T 9/00* (2006.01)
*G06T 9/40* (2006.01)

(52) U.S. Cl.
CPC ................ *G06T 9/001* (2013.01); *G06T 9/40* (2013.01)

(58) Field of Classification Search
CPC ............ G06T 9/001; G06T 9/40; G06T 9/005
See application file for complete search history.

(56) References Cited

U.S. PATENT DOCUMENTS 10,693,492 B1 6/2020 Lasserre et al.
2022/0351423 A1* 11/2022 Martin-Cocher ......... G06T 9/40

FOREIGN PATENT DOCUMENTS

CN 112041889 A 12/2020
EP 3429211 A1 1/2019
EP 4168990 B1 * 4/2024 ............ G06T 9/001

OTHER PUBLICATIONS

Wei Zhang, et al., "[G-PCC] [New proposal] On Planar flag signaling", International Organisation for Standardisation Organisation Internationale de Normalisation ISO/IEC JTC 1/SC 29/WG 7 Coding of Moving Pictures and Audio, ISO/IEC JTC 1/SC 29/WG 7 m58237, Oct. 2021, Online, 5 pages.

(Continued)

*Primary Examiner* — Oneal R Mistry
*Assistant Examiner* — Sydney L Blacksten
(74) *Attorney, Agent, or Firm* — Finnegan, Henderson, Farabow, Garrett & Dunner, L.L.P.

(57) ABSTRACT

A method for encoding a point cloud to generate a bitstream of compressed point cloud data is provided, wherein the point cloud's geometry is represented by an octree-based structure with a plurality of nodes having parent-child relationships by recursively splitting a volumetric space containing the point cloud into sub-volumes each associated with a node of the octree-based structure. The method includes: determining eligibility of planar mode for a present node to be encoded for at least two directions; in the case of eligibility of planar mode in at least two directions of the present node, determining one planar flag indicating planar context information for the at least two directions; and entropy encoding occupancy of the present node based on (Continued)

the determined planar context information to produce encoded data for the bitstream.

19 Claims, 12 Drawing Sheets

(56) References Cited

OTHER PUBLICATIONS

Approved WG 11 document, "G-PCC Future Enhancements", ISO/IEC JTC 1/SC 29/WG 11, Coding of moving pictures and audio, Convenorship: UNI (Italy), N18887, Dec 20, 2019, 4 pages.
Search Report and Written Opinion of the International Searching Authority issued in Application No. PCT/CN2022/128801, Jun. 10, 2022, 12 pages.
Office Action issued by the Intellectual Property India on Jul. 7, 2025, in corresponding Application No. IN 202447035219, 7 pages.

* cited by examiner

METHOD OF ENCODING AND DECODING, ENCODER, AND DECODER

CROSS-REFERENCE TO RELATED APPLICATION

The present application is a US national stage application of International Application No. PCT/CN2021/128801, filed on Nov. 4, 2021, which claims priority to International Application No. PCT/IB2021/059162 filed on Oct. 6, 2021, the entire contents of both of which are incorporated herein by reference.

TECHNICAL FIELD

The present application generally relates to point cloud compression and, particularly, relates to a method of encoding and decoding as well as an encoder and decoder for improved entropy coding of point clouds.

BACKGROUND

As an alternative to 3D meshes, 3D point clouds have recently emerged as a popular representation of 3D media information. Use cases associated with point cloud data are very diverse and include:

3D assets in movie production, 3D assets for real-time 3D immersive telepresence or VR applications, 3D free viewpoint video (for instance for sports viewing), Geographical Information Systems (cartography), Culture heritage (storage of fragile assets in digital form), Autonomous driving (large scale 3D mapping of environment).

A point cloud is a set of points in a 3D space, each with associated attributes, e.g. color, material properties, etc. Point clouds can be used to reconstruct an object or a scene as a composition of such points. They can be captured using multiple cameras and depth sensors in various setups and may be made up of thousands up to billions of points in order to realistically represent reconstructed scenes.

For each point of a point cloud, its position (usually an X, Y, Z information coded as a floating point with 32 or 64 bits) and its attributes (usually at least an RGB color coded in 24 bits) need to be stored. With sometimes billions of points in a point cloud, one can easily understand that the raw data of a point cloud can be several Gigabytes of data: hence, there is a strong need for compression technologies so as to reduce the amount of data required to represent a point cloud.

Two different approaches were developed for point cloud compression:

First, in the Video based Point Cloud Compression (VPCC) approach, a point cloud is compressed by performing multiple projections of it on the 3 different axis/directions X, Y, Z and on different depths so that all points are present in one projected image. Then the projected images are processed into patches (to eliminate redundancy) and re-arranged into a final picture where additional metadata is used to translate pixels positions into point positions in space. The compression is then performed using traditional image/video MPEG encoders. The advantage of this approach is that it reuses existing coders and it naturally supports dynamic point clouds (using video coders) but this is hardly usable for scarce point clouds and it is expected that the compression gain would be higher with point clouds dedicated methods.

Second, in the Geometry based Point Cloud Compression (GPCC) approach, points positions (usually referred to as the geometry) and points attributes (color, transparency . . . ) are coded separately. In order to code the geometry, an octree structure is used. The whole point cloud is fitted into a cube which is continuously split into eight sub-cubes until each of the sub-cubes contains only a single point. The position of the points is therefore replaced by a tree of occupancy information at every node. Since each cube has only 8 sub-cubes, 3 bits are enough to code the occupancy and therefore for a tree of depth D, $3^D$ bits are needed to code the position of a point. While this transformation alone is not enough to provide significant compression gain, it should be noted that since it is a tree, many points share the same node values and thanks to the use of entropy coders, the amount of information can be significantly reduced.

Understanding that many point clouds include surfaces, in the current design of GPCC, a planar coding mode was introduced to code such eligible nodes of the octree more efficiently.

In octree geometry coding method of point cloud compression, the planar coding mode was introduced to code each eligible nodes of the octree more efficiently. More specifically, an is_planar_flag is introduced, which indicates whether or not the occupied child nodes belong to the same horizontal plane. The isPlanar flag is coded by using a binary arithmetic coder with the 8 (2×2×2) bit context information as planar context information. If is_planar_flag is equal to 1, then an extra bit plane_position is signaled to indicate whether this plane is the lower plane or the high plane. The plane position information is coded by using a binary arithmetic coder with 24 (=2×3×2×2) bit context information as plane position context information.

Since each octree node has three directions along the three axis X, Y, Z, and the occupied child nodes along different direction may have different distributions, planar coding mode is then extended to all three directions, and three flags [axisIdx]_planar_flag along each direction (i.e. x_planar_flag, y_planar_flag and z_planar_flag) are used. Specifically, [axisIdx]_planar_flag equals to 1 indicates that the positions of the occupied child nodes form a single plane perpendicular to the axisIdx-th axis, and [axisIdx]_planar_flag equals to 0 indicates that the positions of the occupied child nodes occupy both planes perpendicular to the axisIdx-th axis, i.e. no plane is formed for the respective direction by the child nodes.

In current G-PCC, if the current node is eligible for planar mode in all three directions, it will encode one flag [axisIdx]_planar_flag for each direction, which may not be optimal and will cause an increased number of bits since it needs to encode one flag for each dimension. For example, if current node is eligible for planar mode in all three directions, three flags [axisIdx]_planar_flag are coded by using a binary arithmetic coder with the 3 contexts based on the axis information, then 3 bits information needs to be coded.

Similarly, if current node is eligible for planar mode in exactly two directions, two flags [axisIdx]_planar_flag are coded by using a binary arithmetic coder with the 2 contexts based on the axis information, then two bits information needs to be coded.

Considering point clouds may have many cases where current node is eligible for planar mode in multiple directions, for example in sparse point clouds (since, relative to the case of dense point clouds, the points in sparse point clouds are farther from neighbors, and therefore there is fewer occupied child nodes in current node), so the current G-PCC method will waste many bits in planar mode encoding.

Thus, it is an object of the present invention to provide an encoding and decoding method as well as an encoder and decoder enabling improved compression of point clouds.

SUMMARY

In an aspect of the present invention, a method for encoding a point cloud is provided to generate a bitstream of compressed point cloud data, wherein the point cloud's geometry is represented by an octree-based structure with a plurality of nodes having parent-child relationships by recursively splitting a volumetric space containing the point cloud into sub-volumes each associated with a node of the octree-based structure, comprising the steps:

- Determining eligibility of planar mode for the present node to be encoded for at least two directions;
- In the case of eligibility of planar mode in at least two directions of the present node, determining one planar flag indicating planar context information for the at least two directions;
- Entropy encoding occupancy of the present node based on the determined planar context information to produce encoded data for the bitstream.

In an aspect of the present invention, a method for decoding a bitstream of compressed point cloud data to generate a reconstructed point cloud, wherein the point cloud's geometry is represented by an octree-based structure with a plurality of nodes having parent-child relationships by recursively splitting a volumetric space containing the point cloud into sub-volumes each associated with a node of the octree-bases structure, comprising:

- Determining eligibility of planar mode for the present node to be decoded;
- In the case of eligibility of planar mode in at least two directions of the present node, decoding one planar flag indicating planar context information for the at least two directions;
- Entropy decoding the bitstream based on the determined planar context information of the present node to reconstruct occupancy of the present node.

In an aspect of the present invention, an encoder is provided for encoding a point cloud to generate a bitstream of compressed point cloud data, wherein the point cloud's geometry is represented by an octree-based structure with a plurality of nodes having parent-child relationships by recursively splitting a volumetric space containing the point cloud into sub-volumes each associated with a node of the octree-based structure, the encoder comprising:

- a processor and
- a memory storage device, wherein in the memory storage device instructions executable by the processor are stored that, when executed, cause the processor to perform the method according to the above-described method for encoding.

In an aspect of the present invention, a decoder is provided for decoding a bitstream of compressed point cloud data to generate a reconstructed point cloud, wherein the point cloud's geometry is represented by an octree-based structure with a plurality of nodes having parent-child relationships by recursively splitting a volumetric space containing the point cloud into sub-volumes each associated with a node of the octree-bases structure, the decoder comprising:

- a processor and
- a memory storage device, wherein in the memory storage device instructions executable by the processor are stored that, when executed, cause the processor to perform the above-described method of decoding.

In an aspect of the present invention a non-transitory computer-readable storage medium is provided storing processor-executed instructions that, when executed by a processor, cause the processor to perform the above-described method of encoding and/or decoding.

BRIEF DESCRIPTION OF THE DRAWINGS

Reference will now be made, by way of example, to the accompanying drawings which show example embodiments of the present application, and in which the Figures show.

DETAILED DESCRIPTION OF THE EMBODIMENTS

Figure 1:
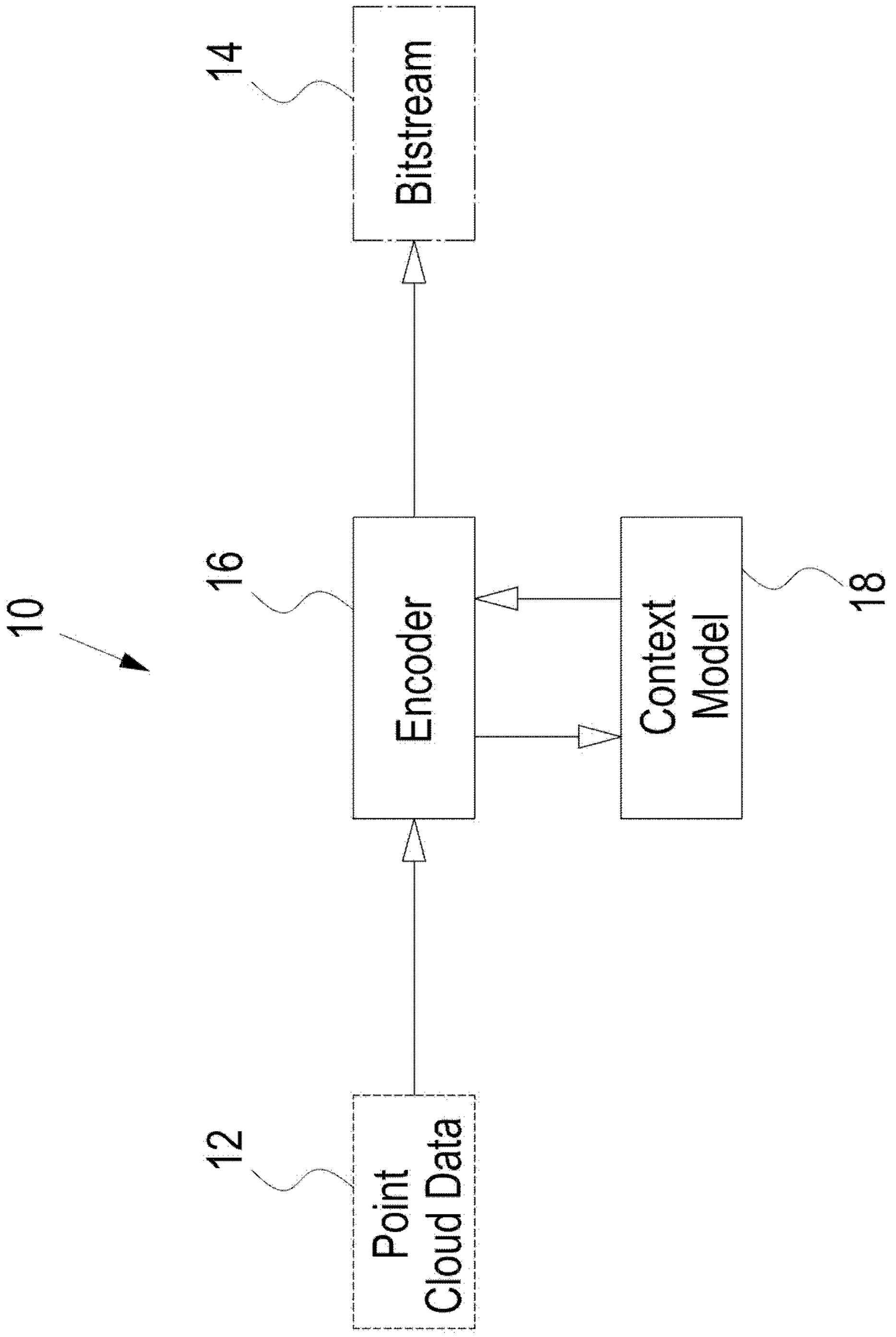
FIG. 1 is a block diagram showing a general view of the point cloud encoder according to an embodiment.

The present application describes methods of encoding and decoding point clouds, and encoders and decoders for encoding and decoding point clouds. A present parent node associated with a sub-volume is split into further sub-volumes, each further sub-volume corresponding to a child node of the present parent node, and, at the encoder, eligibility of planar mode for the present node to be encoded determined for at least two directions. In the case of eligibility of planar mode in at least two directions of the present node, determining one planar flag indicating planar context information for the at least two directions. The occupancy of the present node is encoded based on the determined planar context information to produce encoded data for the bitstream. The decoder determines the same planar context information and entropy decodes the bitstream to reconstruct the occupancy pattern.

Other aspects and features of the present application will be understood by those of ordinary skill in the art from a review of the following description of examples in conjunction with the accompanying figures.

At times in the description below, the terms "node" and "sub-volume" may be used interchangeably. It will be appreciated that a node is associated with a sub-volume. The node is a particular point on the tree that may be an internal node or a leaf node. The sub-volume is the bounded physical space that the node represents. The term "volume" may be used to refer to the largest bounded space defined for containing the point cloud. The volume is recursively divided into sub-volumes for the purpose of building out a tree-structure of interconnected nodes for coding the point cloud data.

A point cloud is a set of points in a three-dimensional coordinate system. The points are often intended to represent the external surface of one or more objects. Each point has a location (position) in the three-dimensional coordinate system. The position may be represented by three coordinates (X, Y, Z), which can be Cartesian or any other coordinate system. The points may have other associated attributes, such as color, which may also be a three-component value in some cases, such as R, G, B or Y, Cb, Cr. Other associated attributes may include transparency, reflectance, a normal vector, etc., depending on the desired application for the point cloud data.

Point clouds can be static or dynamic. For example, a detailed scan or mapping of an object or topography may be static point cloud data. The LiDAR-based scanning of an environment for machine-vision purposes may be dynamic in that the point cloud (at least potentially) changes over time, e.g. with each successive scan of a volume. The dynamic point cloud is therefore a time-ordered sequence of point clouds.

Point cloud data may be used in a number of applications, including conservation (scanning of historical or cultural objects), mapping, machine vision (such as autonomous or semi-autonomous cars), and virtual reality systems, to give some examples. Dynamic point cloud data for applications like machine vision can be quite different from static point cloud data like that for conservation purposes. Automotive vision, for example, typically involves relatively small resolution, non-coloured and highly dynamic point clouds obtained through LiDAR (or similar) sensors with a high frequency of capture. The objective of such point clouds is not for human consumption or viewing but rather for machine object detection/classification in a decision process. As an example, typical LiDAR frames contain on the order of tens of thousands of points, whereas high quality virtual reality applications require several millions of points. It may be expected that there will be a demand for higher resolution data over time as computational speed increases and new applications are found.

While point cloud data is useful, a lack of effective and efficient compression, i.e. encoding and decoding processes, may hamper adoption and deployment.

One of the more common mechanisms for coding point cloud data is through using tree-based structures. In a tree-based structure, the bounding three-dimensional volume for the point cloud is recursively divided into sub-volumes. Nodes of the tree correspond to sub-volumes. The decision of whether or not to further divide a sub-volume may be based on the resolution of the tree and/or whether there are any points contained in the sub-volume. A leaf node may have an occupancy flag that indicates whether its associated sub-volume contains a point or not. Splitting flags may signal whether a node has child nodes (i.e. whether a current volume has been further split into sub-volumes). These flags may be entropy coded in some cases and in some cases predictive coding may be used.

Figure 3:
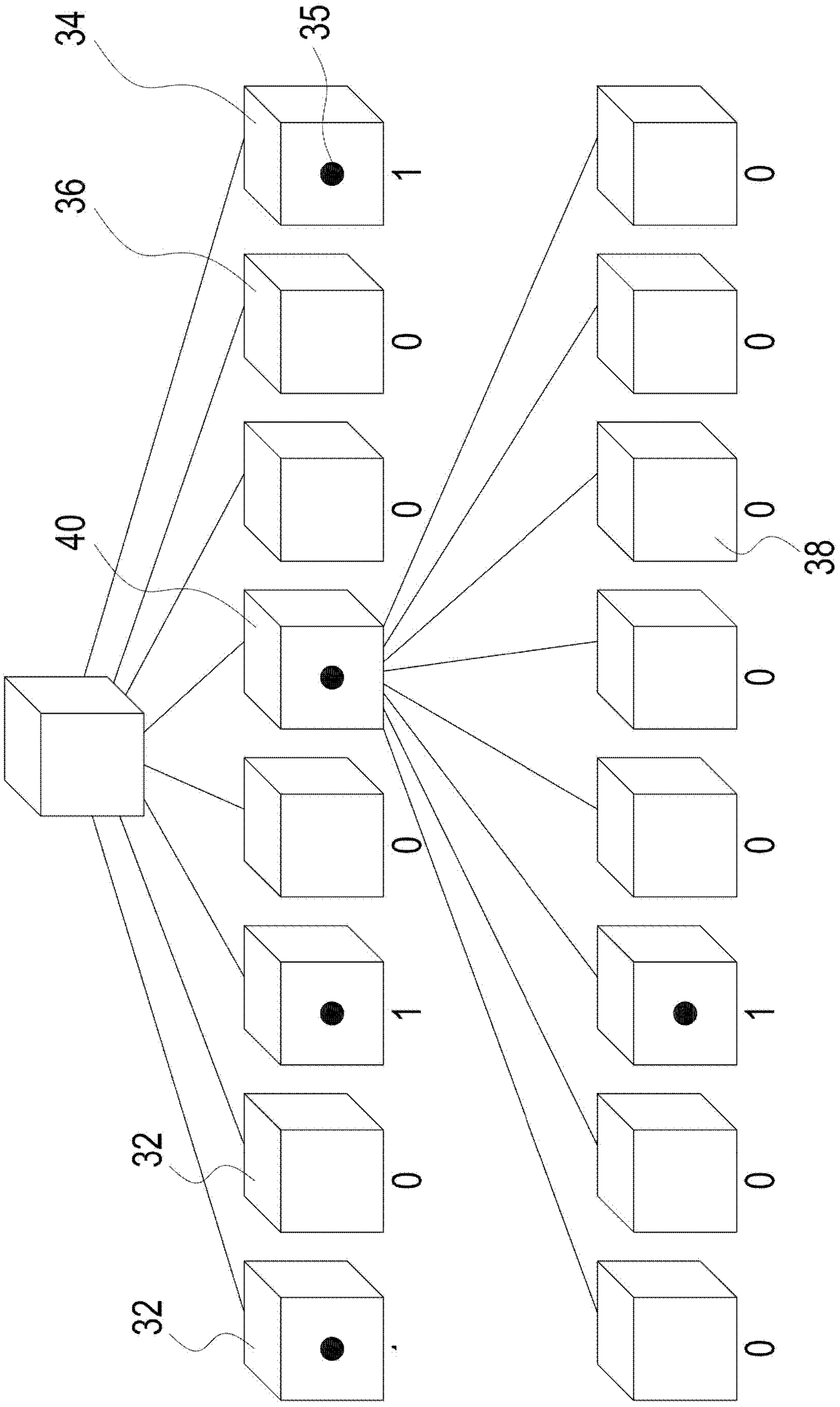
FIG. 3 is a schematic illustration of an octree data structure according to an embodiment.

A commonly-used tree structure is an octree. In this structure, the volumes/sub-volumes are all cubes and each split of a sub-volume results in eight further sub-volumes/sub-cubes. An example for such a tree-structure is shown in FIG. 3 having a node 30 that might represent the volume containing the complete point cloud. This volume is split into eight sub-volumes 32, each associated with a node in the octree of FIG. 3. Points in the nodes indicate occupied nodes 34 containing at least one point 35 of the point cloud, while empty nodes 36 are representing sub-volumes with no points of the point clouds. As depicted in FIG. 3, occupied nodes might by further split into eight sub-volumes associated with child nodes 38 of a particular parent node 40 in order to determine the occupancy pattern of the parent node 40. As shown in FIG. 3, the occupancy pattern of the exemplified parent node 40 might be represented as "00100000" in a binary form, indicating an occupied third child node 38. In some realizations this occupancy pattern is encoded by a binary entropy encoder to generate a bitstream of the point cloud data.

Reference is now made to FIG. 1, which shows a simplified block diagram of a point cloud encoder 10 in accordance with aspects of the present application. The point cloud encoder 10 receives the point cloud data and might include a tree building module for producing an octree representing the geometry of the volumetric space containing point cloud and indicating the location or position of points from the point cloud in that geometry.

The basic process for creating an octree to code a point cloud may include:

1. Start with a bounding volume (cube) containing the point cloud in a coordinate system;
2. Split the volume into 8 sub-volumes (eight sub-cubes);
3. For each sub-volume, mark the sub-volume with 0 if the sub-volume is empty, or with 1 if there is at least one point in it;
4. For all sub-volumes marked with 1, repeat (2) to split those sub-volumes, until a maximum depth of splitting is reached; and
5. For all leaf sub-volumes (sub-cubes) of maximum depth, mark the leaf cube with 1 if it is non-empty, 0 otherwise.

The tree may be traversed in a pre-defined order (breadth-first or depth-first, and in accordance with a scan pattern/order within each divided sub-volume) to produce a sequence of bits representing the occupancy pattern of each node.

This sequence of bits may then be encoded using an entropy encoder 16 to produce a compressed bitstream 14. The entropy encoder 16 may encode the sequence of bits using a context model 18 that specifies probabilities for coding bits based on a context determination by the entropy encoder 16. The context model 18 may be adaptively updated after coding of each bit or defined set of bits.

Like with video or image coding, point cloud coding can include predictive operations in which efforts are made to predict the pattern for a sub-volume, and the residual from the prediction is coded instead of the pattern itself. Predictions may be spatial (dependent on previously coded sub-volumes in the same point cloud) or temporal (dependent on previously coded point clouds in a time-ordered sequence of point clouds).

Figure 2:
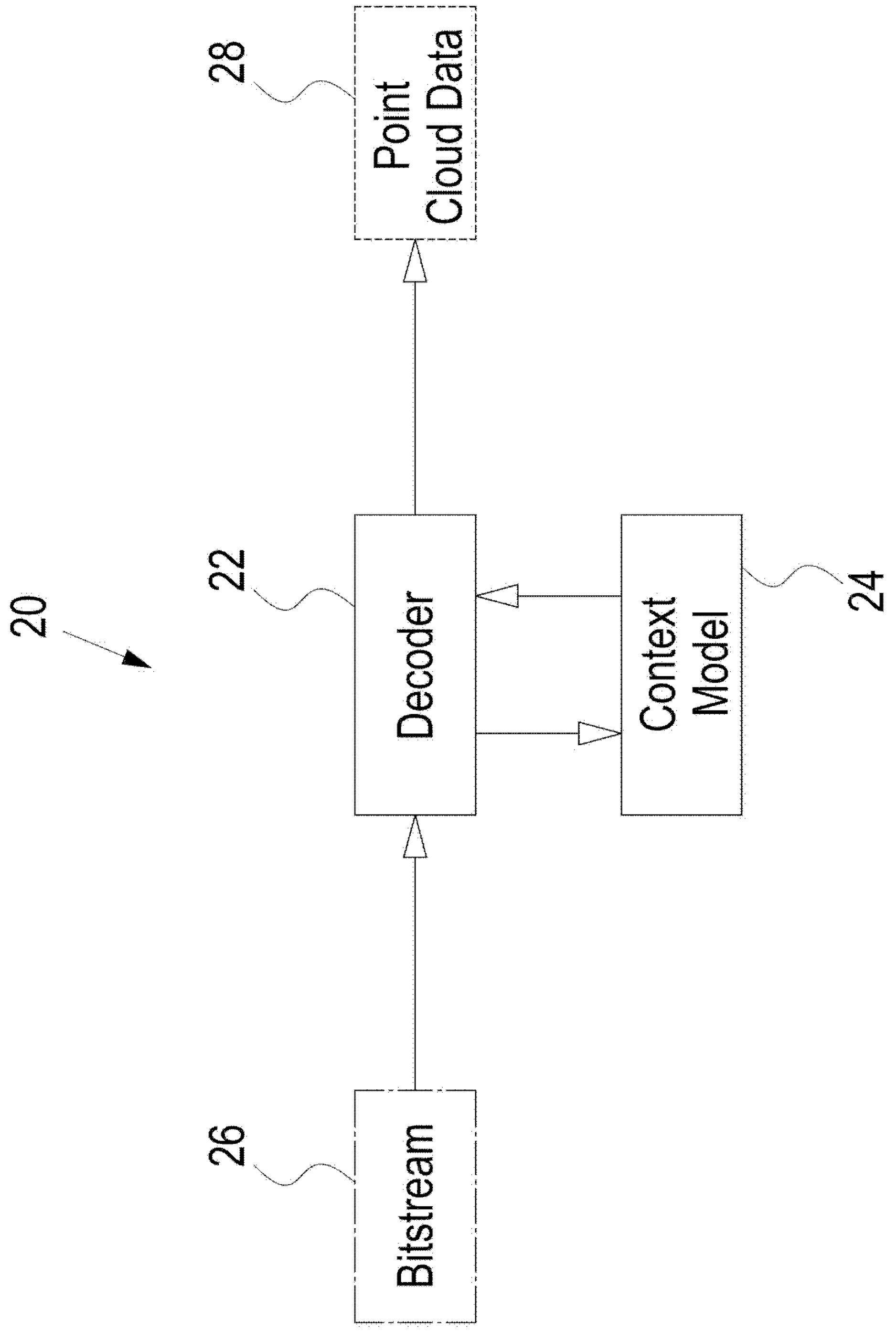
FIG. 2 is a block diagram showing a general view of the point cloud decoder according to an embodiment.

A block diagram of an example point cloud decoder 20 that corresponds to the encoder 10 is shown in FIG. 2. The point cloud decoder 20 includes an entropy decoder 22 using the same context model 24 used by the encoder 10. The entropy decoder 22 receives the input bitstream 26 of compressed data and entropy decodes the data to produce an output sequence of decompressed bits. The sequence is then converted into reconstructed point cloud data by a tree reconstructor. The tree reconstructor rebuilds the tree structure 28 from the decompressed data and knowledge of the scanning order in which the tree data was binarized. The tree reconstructor is thus able to reconstruct the location of the points from the point cloud.

Figure 4:
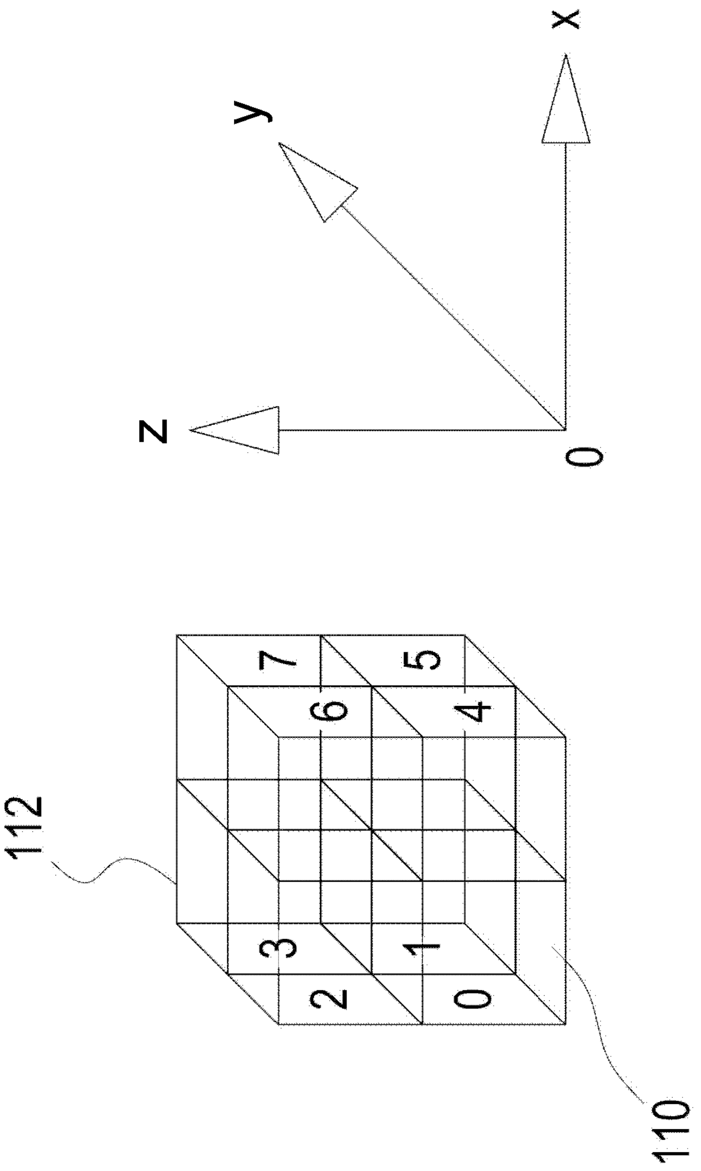
FIG. 4 illustrates numbering of the eight sub-nodes in each node according to an embodiment.

Referring to FIG. 4, showing a parent node 112 split into its eight child nodes 110 being 2×2×2 cubes with each having the same size and with an edge length being half the edge length of the cube associated with the parent node 112. Further, FIG. 4 indicates the used numbering of the child nodes 110 within a parent node 112. The numbering system shown in FIG. 4 will be used in the further explanation. Therein, FIG. 4 also indicates the spatial orientation of the shown parent node 112 in the three-dimensional space indicated by the geometrical axis or directions X, Y, Z.

Therein, the occupancy pattern might include planar information about the probability whether a certain node is occupied since the point in this node belongs to a surface. Usually, the real world is dominated by closed surfaces. This is in particular true for indoor rooms but also for urban outdoor scenes. This fact is used by the entropy encoder and decoder. If a surface represented by the point cloud can be detected, predictions about the distribution of point on this surface can be made and thus a probability for the occupancy of a certain node belonging to this surface can be made. This is done by defining planar context information used for encoded and decoding the bitstream using an isPlanar-flag. Therein, planar context information is usually a binary value wherein a set isPlanar-flag (isPlanar=1) for a certain node and a certain direction is interpreted that there is a prevailing likelihood that this node belongs to a certain surface, wherein this surface would be perpendicular to the respective direction/axis. In addition to the mere fact of the presence of a surface in a node, further planar context information might be considered such as plane position information implemented by a planePosition-flag indicating the position of the plane within the present node. planePosition-flag might also be a binary value, having the values "high" and "low" referring to the respective position. This planar information is used for encoded to the bitstream by usage of the planar context information by the entropy encoder/decoder thereby reducing the data of the bitstream.

Thus, in the prior art, if the current/present node is eligible for planar mode in all three directions, three flags [axisIdx]_planar_flag are coded by using a binary arithmetic coder with the 3 contexts based on the axis information, then 3 bits information need to be coded. Similarly, if current node is eligible for planar mode in two directions, two flags [axisIdx]_planar_flag are coded by using a binary arithmetic coder with the 2 contexts based on the axis information, then two bits information needs to be coded. Considering point clouds may have many cases where the current node is eligible for planar mode in multiple directions, for example in sparse point clouds (since, relative to the case of dense point clouds, the points in sparse point clouds are farther from neighbours, and therefore there is fewer occupied child nodes in current node), the current G-PCC method will waste many bits in planar mode encoding.

Figure 5:
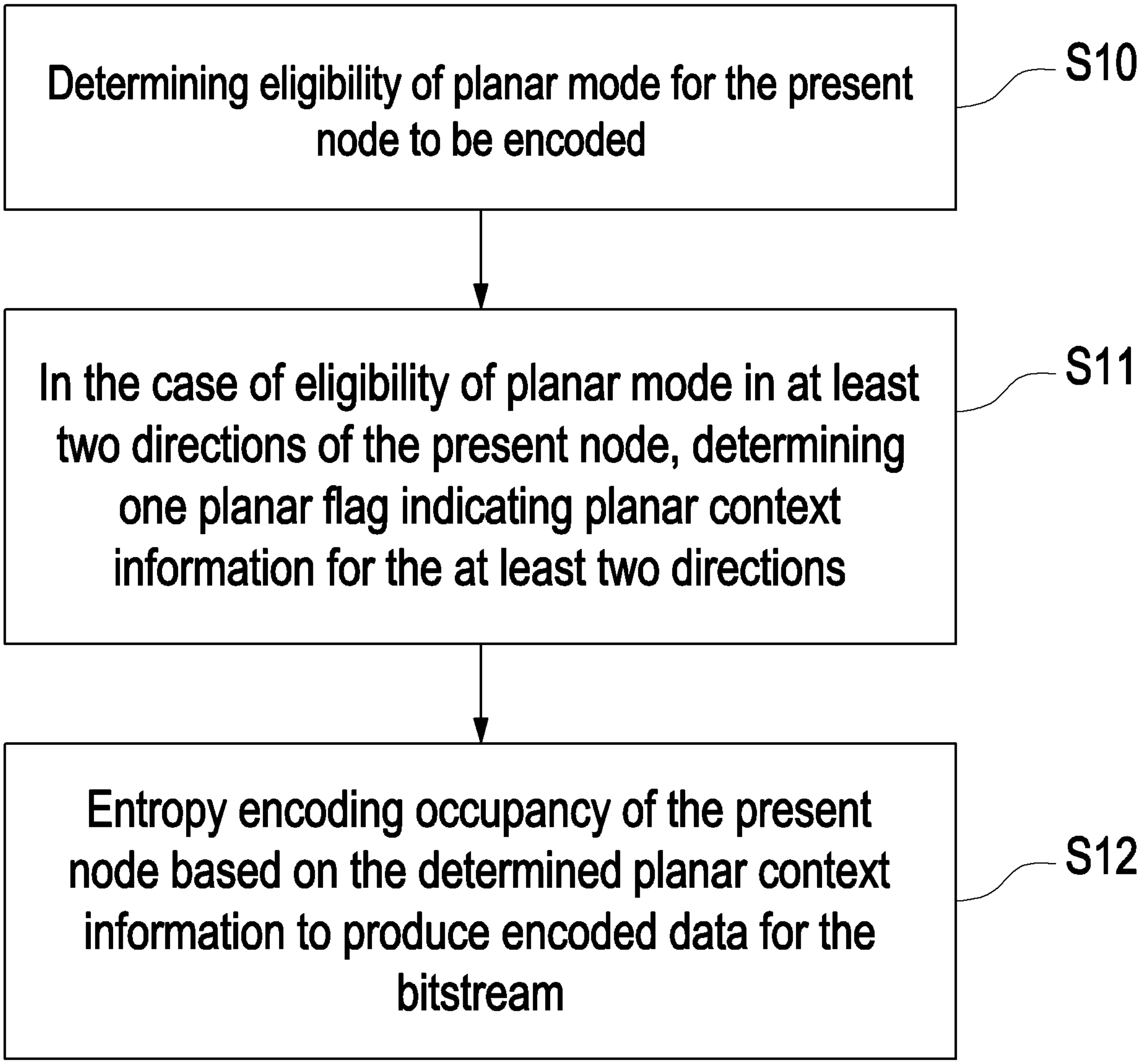
FIG. 5 is a flow diagram illustrating the steps of encoding according to an embodiment.

Referring to FIG. 5, in accordance with the present disclosure, a method for encoding a bitstream is provided.

In step S10, eligibility of planar mode for the present node to be encoded is determined for at least two directions and preferably for all three directions. Therein, the three directions corresponded or are denoting the three axis of the three-dimensional coordinate system of the point cloud.

In step S11, in the case of eligibility of planar mode in at least two directions of the present node, one planar flag indicating planar context information for the at least two directions is determined. Therein, the one planar flag is commonly indicating planar context information for all eligible directions instead of individual planar flags for each of the directions.

In step S12, occupancy of the present node is encoded by a binary arithmetic encoder based on the determined planar context information to produce encoded data for the bitstream.

Thus, according to the present invention, eligibility of planar mode for the present or current node to be encoded is determined in all three directions, i.e. along all three axis X, Y, Z. If eligibility for planar mode is given for two or three directions, a single, common planar flag is encoded, wherein the common planar flag indicates planar context information for the eligible directions. Therein planar context information may include isPlanar flag, indicating whether the child nodes of the present node belong to a surface. This context information is used for entropy encoding of the bitstream preferably by a binary arithmetic encoder. In this manner, the complete tree is traversed to determine an occupancy for each node and provides sufficient context information for the entropy encoder. Therein, by combination of the planar context information for two or more directions into one bit, number of necessary bits can be reduced improving compression of the point cloud bitstream. In some embodiments, further planar context information may be used in addition such as planePosition for the individual directions.

Figure 6:
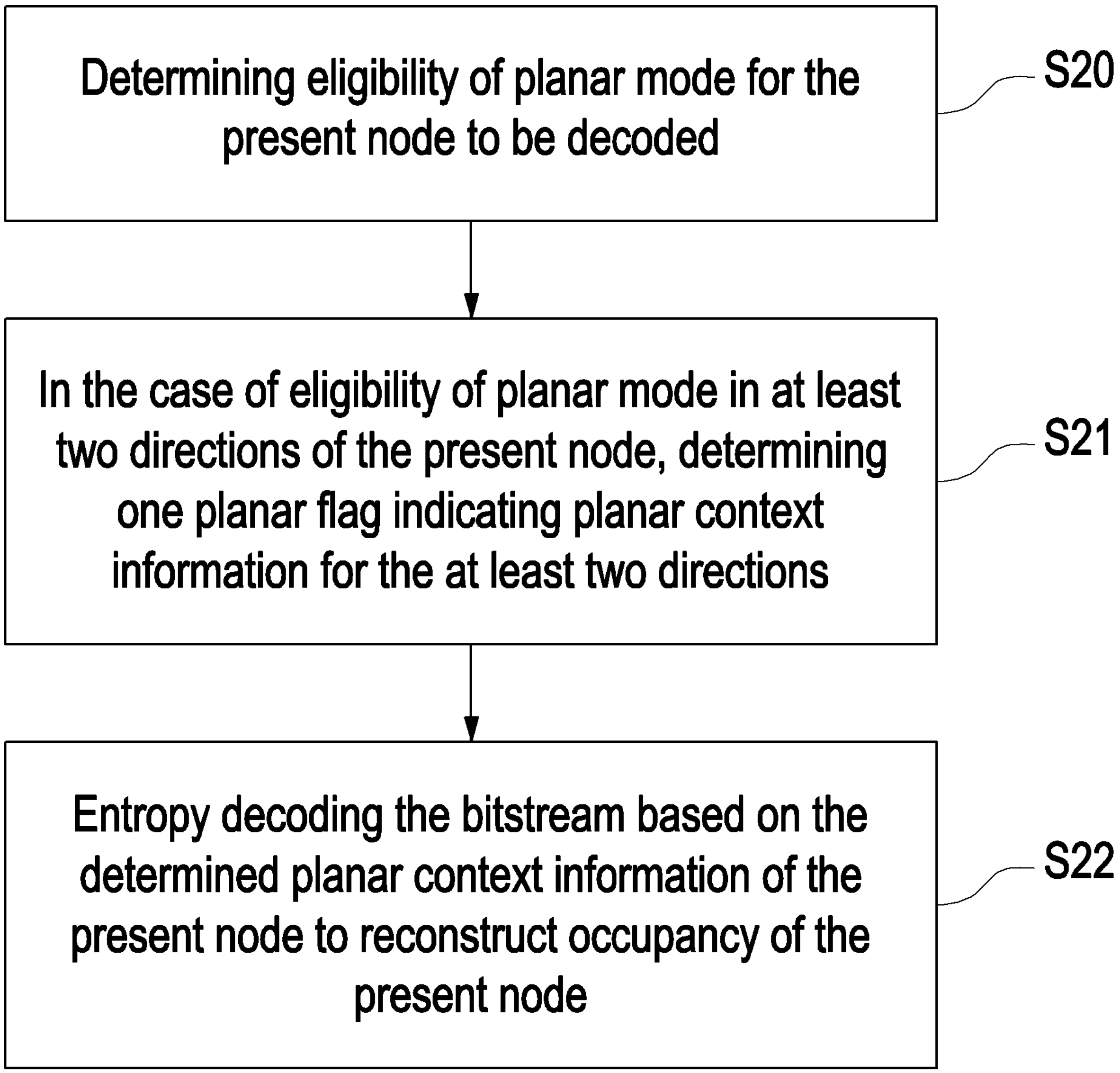
FIG. 6 is a flow diagram illustrating the steps of decoding according to an embodiment.

Referring to FIG. 6, in accordance with the present disclosure, a method for decoding a bitstream is provided.

In step S20, eligibility of planar mode for the present node to be decoded is determined for at least two directions and preferably for all three directions. Therein, the three directions corresponded or are denoting the three axis of the three-dimensional coordinate system of the point cloud.

In step S21, in the case of eligibility of planar mode in at least two directions of the present node, one planar flag indicating planar context information for the at least two directions is decoded. Therein, the one planar flag is commonly indicating planar context information for all eligible directions instead of individual planar flags for each of the directions.

In step S22, occupancy of the present node is decoded preferably by a binary arithmetic decoder based on the determined planar context information to produce encoded data for the bitstream.

Thus, according to the present invention, eligibility of planar mode for the present or current node to be decoded is determined in all three directions, i.e. along all three axis X, Y, Z. If eligibility for planar mode is given for two or three directions, a single, common planar flag is decoded, wherein the common planar flag indicates planar context information for the eligible directions. Therein planar context information may include isPlanar flag, indicating whether the child nodes of the present node belong to a surface. This context information is used for entropy decoding of the bitstream preferably by a binary arithmetic decoder. In this manner, the complete tree is traversed to determine an occupancy for each node and provides sufficient context information for the entropy decoder. Therein, by combination of the planar context information for two or more directions into one bit, number of necessary bits can be reduced improving compression of the point cloud bitstream. In some embodiments, further planar context information may be used in addition such as planePosition for the individual directions. Thus, for decoding the same information is used, i.e. eligibility for planar mode to determine how many flags are used to indicate isPlanar and how to interpret the bits of the bitstream to be decoded. Since eligibility is the same at encoding and decoding consistent interpretation of the flags in the bitstream between the encoder and the decoder are ensured.

Figure 7:
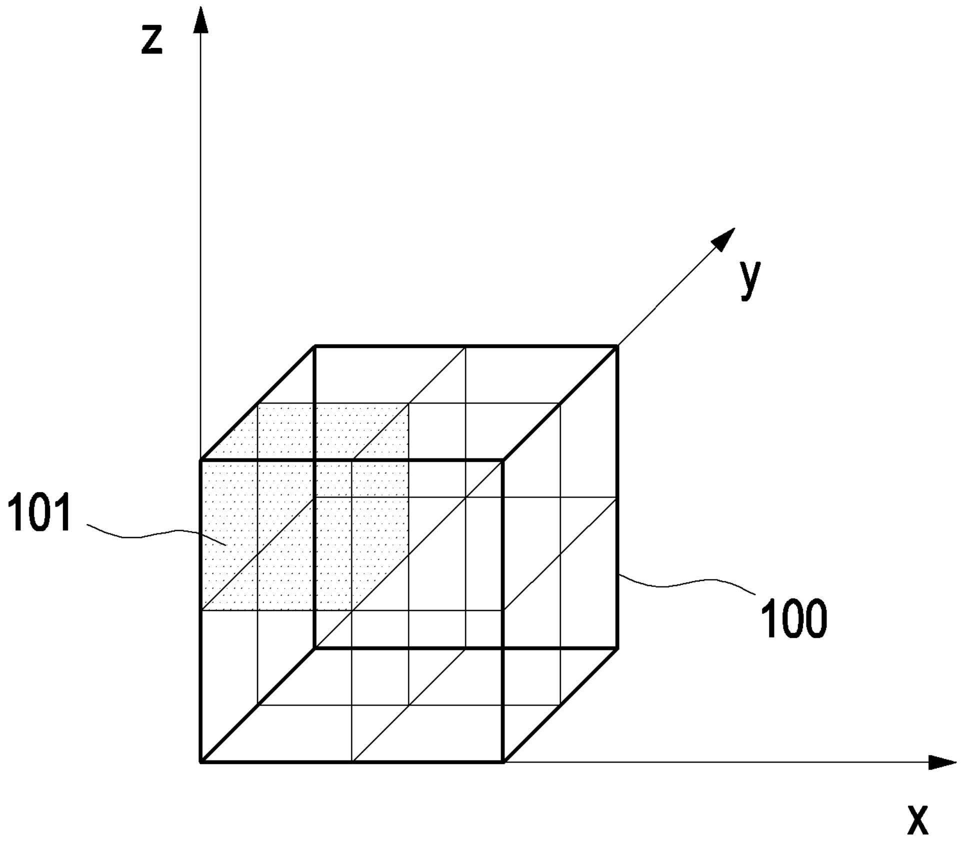
FIG. 7 illustrates eligibility for planar mode in three directions according to an embodiment.

Referring now to FIG. 7 showing an example for a node 100 to be encoded/decoded, wherein only one child node 101 of the present node 100 is occupied. In this configuration, the present node 100 is eligible for planar mode in all three directions X, Y, Z. When the current node is eligible for planar mode in all three directions, in order to reduce the signaling flag numbers, the present invention introduces a new flag xyz_planar_flag.

When xyz_planar_flag is equal to 1, it indicates that the positions of the occupied child nodes 101 of current node 100 form a single plane in all three directions, wherein accordingly, each plane is perpendicular to the respective direction. By doing so the present invention uses a single flag instead of three. With the current G-PCC method, three flags are all set to 1 (i.e. x_planar_flag=1, y_planar_flag=1 and z_planar_flag=1), whereas according with the present invention only encodes one flag to indicate planar context information in all directions instead of encoding three flags, such that number of necessary bits can be reduce by ⅔ and achieve a better coding performance.

As shown in FIG. 7, when there is only one occupied child node 101 in current node 100, the position of occupied child node 101 may forms a single plane in all three (X, Y and Z) directions.

Additionally, when xyz_planar_flag is equal to 0, the positions of the occupied child nodes 101 of current node 100 form a single plane in at most two directions. Under this condition two unitary direction planar flags x_planar_flag and y_planar_flag are encoded, wherein each unitary direction planar flag indicating presence of a plane in one direction. If x_planar_flag and y_planar_flag are both equal to 1, then it can be inferred that the z_planar_flag must be 0, so there is no need to signal or included the third unitary direction planar flag z_planar_flag, and only two unitary direction planar flags (x_planar_flag and y_planar_flag) need to be signaled, thus the encoded flag numbers can be reduced.

Figure 8:
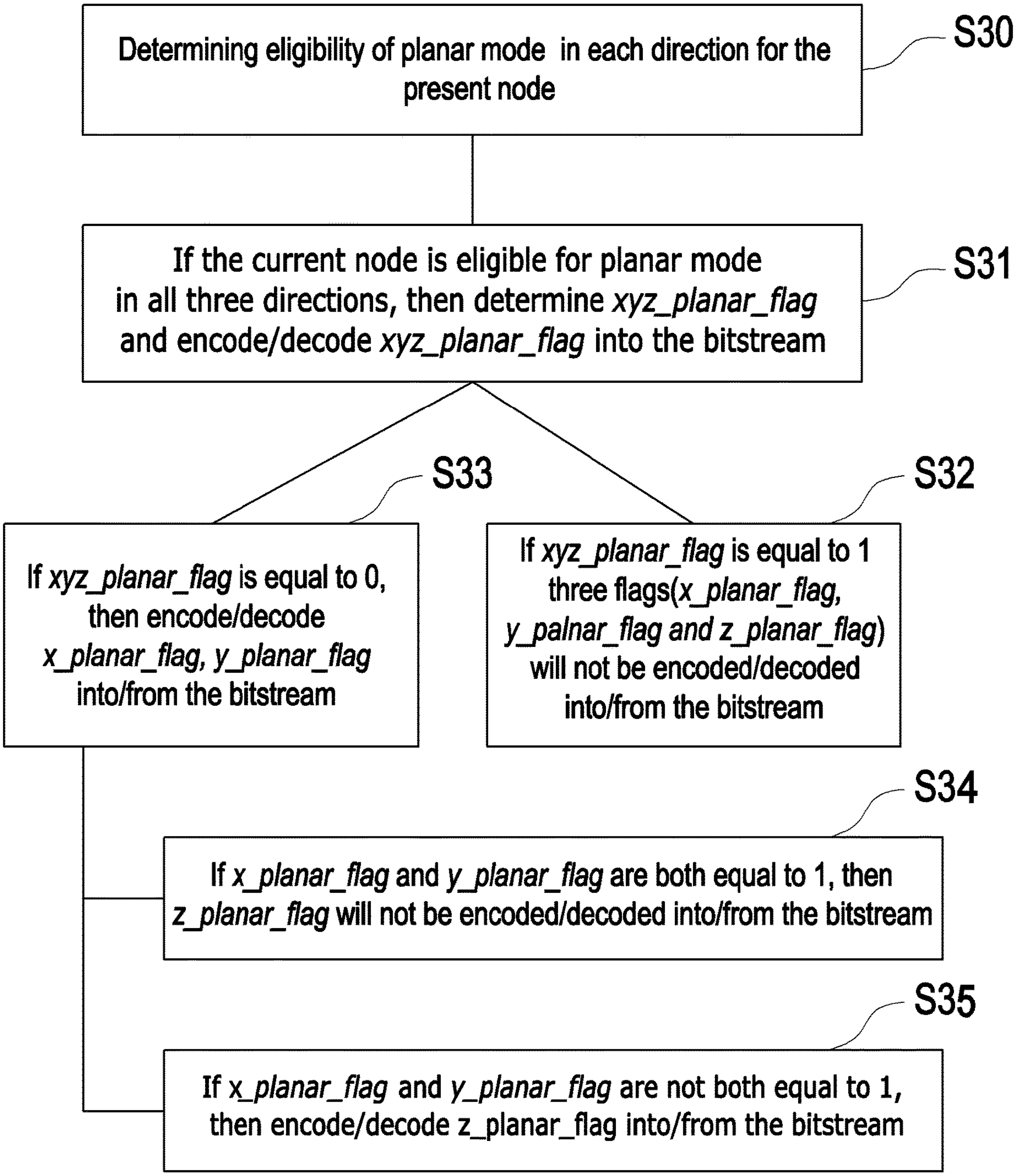
FIG. 8 is a flow diagram of the present invention for eligibility for planar mode in three directions according to an embodiment.

Referring to FIG. 8 showing a flow diagram of the present invention for eligibility for planar mode in three directions.

In step S30, corresponding to step S10 for encoding as described above with respect to FIG. 5, eligibility of planar mode for the present node 100 is determined.

In step S31, if the current node is eligible for planar mode in all three directions, then determine xyz_planar_flag and encode it into bitstream.

In step S32, if xyz_planar_flag is equal to 1, than no individual flags are encoded (i.e. individual flags x_planar_flag, y_planar_flag and z_planar_flag as used in the prior art) into bitstream.

Alternatively, in step S33, if xyz_planar_flag is equal to 0, then encode two additional unitary direction planar flags x_planar_flag, y_planar_flag into bitstream.

In step S34, if the two additional unitary direction planar flags x_planar_flag and y_planar_flag are both equal to 1, then the third unitary direction planar flag z_planar_flag is not encoded into the bitstream because it can be inferred that z_planar_flag must be 0.

Alternatively, in step S35, if the two additional unitary direction planar flags x_planar_flag and y_planar_flag are not both equal to 1, then encode the third unitary direction planar flag z_planar_flag into bitstream.

In a similar way, the decoding process on the decoder side follows the steps also included in FIG. 8:

In step S30, corresponding to step S20 for encoding as described above with respect to FIG. 6, eligibility of planar mode for the present node 100 is determined.

In step S31, if the current node is eligible for planar mode in all three directions, then decode xyz_planar_flag from bitstream.

In step S32, if xyz_planar_flag is equal to 1, than no individual flags are decoded from/present in the bitstream (i.e. individual flags x_planar_flag, y_planar_flag and z_planar_flag as used in the prior art).

Alternatively, in step S33, if xyz_planar_flag is equal to 0, then decode two additional unitary direction planar flags x_planar_flag, y_planar_flag from bitstream.

In step S34, if the two additional unitary direction planar flags x_planar_flag and y_planar_flag are both equal to 1, then the third unitary direction planar flag z_planar_flag is not decoded from/present in the bitstream because it can be inferred that z_planar_flag must be 0.

Alternatively, in step S35, if the two additional unitary direction planar flags x_planar_flag and y_planar_flag are not both equal to 1, then decode the third unitary direction planar flag z_planar_flag from the bitstream.

Figure 9:
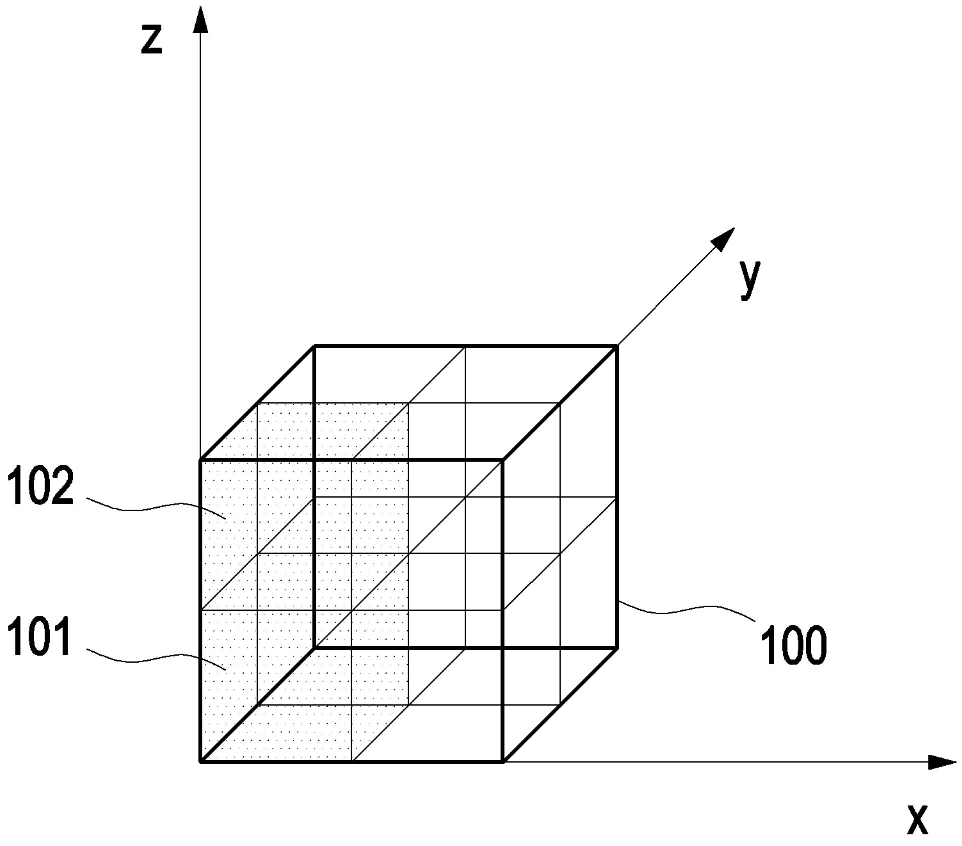
FIG. 9 illustrates a detailed embodiment of the present invention for eligibility for planar mode in two directions according to an embodiment.

Referring now to FIG. 9 showing an example for a node 100 to be encoded/decoded, wherein two child nodes 101, 102 of the present node 100 are occupied.

When the current node is eligible for planar mode in only two directions, in order to reduce the signaling flag numbers, the present invention introduces three new flags, i.e. xy_planar_flag, xz_planar_flag and yz_planar_flag. In the following xy_planar_flag is taken as an example. The same applies to the xz_planar_flag and yz_planar_flag correspondingly.

If xy_planar_flag is equal to 1, as shown in FIG. 9, it indicates that the positions of the occupied child nodes 101, 102 of current node 100 form a single plane in both x and y directions, which is the same as two flags are both equal to 1 (i.e. x_planar_flag=1 and y_planar_flag=1) in the prior art. Thus, according to the present invention, it only needs to encode one flag to indicate planar context information in both X and Y directions instead of encoding two individual flags, so the present invention can reduce the signaling flag numbers and achieve a better coding performance. The same applies to the situation if for example the child nodes at the position 0 and 1 (see FIG. 4) are occupied. Then, xz_planar_flag would be used and set to 1 to indicate planar context information in both X and Z directions instead of encoding two individual flags. And if, for example, the child nodes at the position 0 and 4 (see FIG. 4) are occupied, then, yz_planar_flag would be used and set to 1 to indicate planar context information in both Y and Z directions instead of encoding two individual flags.

Proceeding with the example of FIG. 9, if xy_planar_flag is equal to 0, it means the positions of the occupied child nodes 101, 102 of current node 100 form a single plane in at most one direction. Under this condition, at least one additional unitary direction planar flag (x_planar_flag) is encoded/decoded. If the one additional unitary direction planar flag x_planar_flag is equal to 1, then it can be inferred that there is no plane in the remaining Y direction and the corresponding y_planar_flag would be 0, so there is no need to signal y_planar_flag, and only one unitary direction planar flag (x_planar_flag) needs to be signaled instead of two individual flags, thus the encoded flag numbers can be reduced relative to prior art. If the one additional unitary direction planar flag (x_planar_flag) is 0, then a second unitary direction planar flag (y_planar_flag) need to be encoded/decoded.

Figure 10:
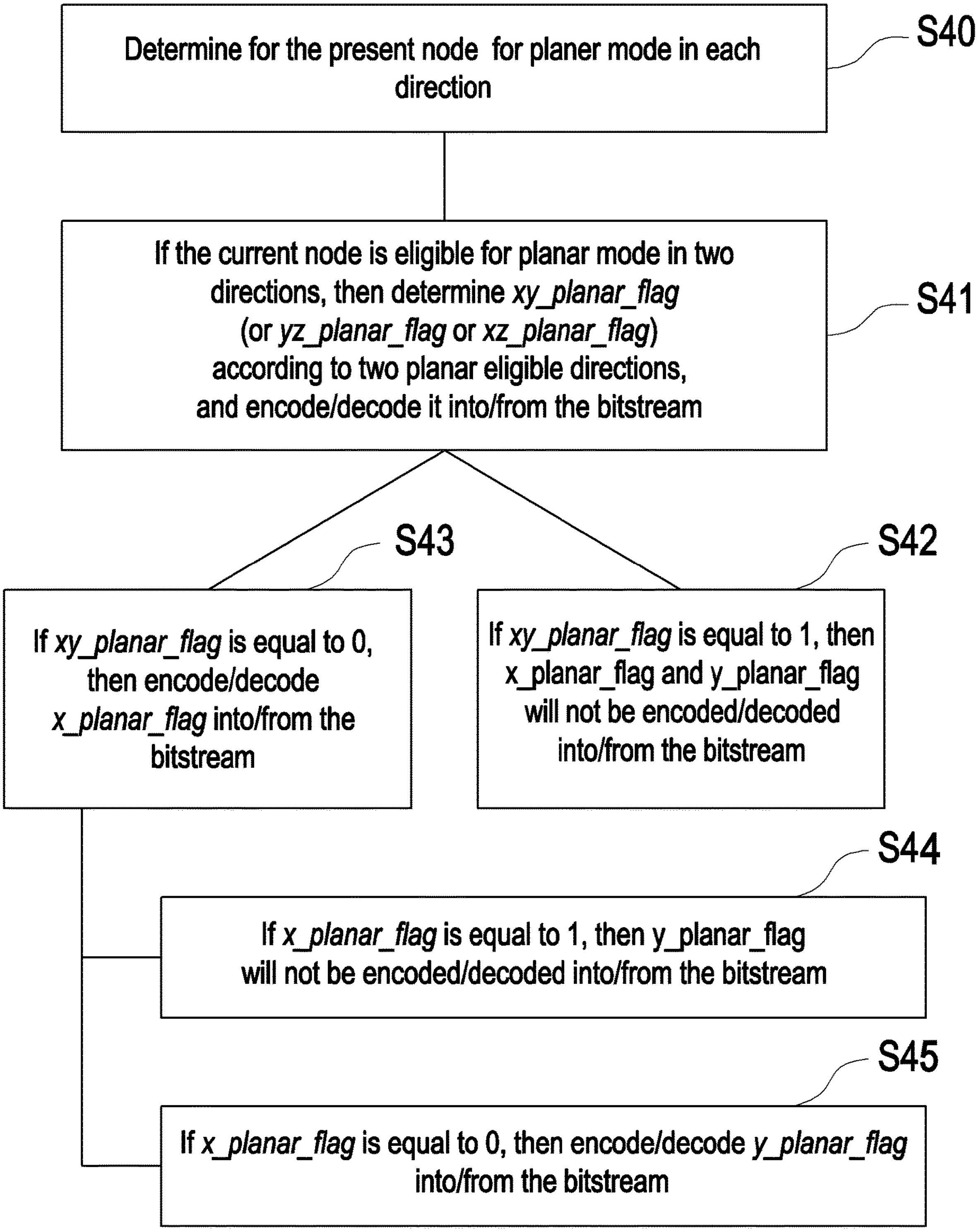
FIG. 10 is a flow diagram of the present invention for eligibility for planar mode in two directions according to an embodiment.

Referring to FIG. 10 showing a flow diagram of the present invention for eligibility for planar mode in two directions.

In step S40, corresponding to step S10 for encoding as described above with respect to FIG. 5, eligibility of planar mode for the present node 100 is determined for each direction X, Y, Z.

In step S41, if the current node is eligible for planar mode in two directions, then determine xy_planar_flag and encode it into bitstream. Therein, xy_planar_flag is only used as an example and alternatively, depended on the directions for which planar mode is eligible, xz_planar_flag or yz_planar_flag might be used and encoded into the bitstream.

In step S42, if xy_planar_flag is equal to 1 (or in another example either xz_planar_flag=1 or yz_planar_flag=1), then no individual flags are encoded (i.e. individual flags x_planar_flag, y_planar_flag for the example of eligibility of planar mode in the X and Y direction) into bitstream.

Alternatively, in step S43, if xy_planar_flag is equal to 0, then encode one additional unitary direction planar flag x_planar_flag into bitstream.

In step S44, if the one additional unitary direction planar flag x_planar_flag is equal to 1, then a second unitary direction planar flag y_planar_flag is not encoded into the bitstream because it can be inferred that y_planar_flag must be 0.

Alternatively, in step S45, if the one additional unitary direction planar flag x_planar_flag is not equal to 1, then encode the second unitary direction planar flag y_planar_flag into bitstream.

In a similar way, the decoding process on the decoder side follows the steps also included in FIG. 10:

In step S40, corresponding to step S20 for decoding as described above with respect to FIG. 6, eligibility of planar mode for the present node 100 is determined for each direction X, Y, Z.

In step S41, if the current node is eligible for planar mode in two directions, then decode xy_planar_flag from bitstream. Therein, xy_planar_flag is only used as an example and alternatively, depended on the directions for which planar mode is eligible, xz_planar_flag or yz_planar_flag might be used and decoded from the bitstream.

In step S42, if xy_planar_flag is equal to 1 (or in another example either xz_planar_flag=1 or yz_planar_flag=1), then no individual flags are decoded (i.e. individual flags x_planar_flag, y_planar_flag as used in the prior art for the example of eligibility of planar mode in the X and Y direction) from the bitstream or present in the bitstream.

Alternatively, in step S43, if xy_planar_flag is equal to 0, then decode one additional unitary direction planar flag x_planar_flag from bitstream.

In step S44, if the one additional unitary direction planar flag x_planar_flag is equal to 1, then a second unitary direction planar flag y_planar_flag is not decoded from the bitstream or present in the bitstream because it can be inferred that y_planar_flag must be 0.

Alternatively, in step S45, if the one additional unitary direction planar flag x_planar_flag is not equal to 1, then decode the second unitary direction planar flag y_planar_flag from bitstream.

As mentioned above, if eligibility for planar mode given in X and Y direction, the xy_planar_flag is used and x_planar_flag or y_planar_flag may be used as the one additional unitary direction planar flag and the other one may be included as second unitary direction planar flag. If eligibility for planar mode given in X and Z direction, the xz_planar_flag is used and x_planar_flag or z_planar_flag may be used as the one additional unitary direction planar flag and the other one may be included as second unitary direction planar flag. If eligibility for planar mode given in Y and Z direction, the yz_planar_flag is used and y_planar_flag or z_planar_flag may be used as the one additional unitary direction planar flag and the other one may be included as second unitary direction planar flag.

Thus, in accordance with the present invention, number of necessary bits for indicating planar context information can be reduced. Thereby, significant data reduction of more than 0.5% and preferably more than 0.7% can be achieved with respect to prior encoding methods and current GPCC specification. However, this value is dependent on the density of the points of the point cloud.

In a preferred embodiment the method for encoding/decoding_a point cloud to generate a bitstream of compressed point cloud data is implemented in a LIDAR (Light detection and ranging) device. The LIDAR device comprises a light transmitting module and a sensor module. Therein, the light transmitting module is configured to scan the environment with laser light and an echo of the laser light reflected by objects in the environment is measured with a sensor of the sensor module. Further, the LIDAR device comprises an evaluation module configured to determine a 3D representation of the environment in a point cloud preferably by differences in laser return times and/or wavelengths of the reflected laser light. Thereby, the echo may include up to millions of points of position information of the objects or environment resulting in large point clouds increasing the demands on computational devices to further process or evaluating this point clouds. In certain applications such as autonomous driving, processing of the LIDAR point cloud must be almost in real-time due to safety requirements. Thus, efficient compression of the point could data is necessary. Therefore, the LIDAR device may comprise an encoder including a processor and a memory storage device. The memory storage device may store a computer program or application containing instructions that, when executed, cause the processor to perform operations such as those described herein. For example, the instructions may encode and output bitstreams encoded in accordance with the methods described herein. Additionally, or alternatively, the LIDAR device may comprise a decoder including a processor and a memory storage device. The memory storage device may include a computer program or application containing instructions that, when executed, cause the processor to perform operations such as those described herein. Thus, by the encoder/decoder efficient compression of the point cloud data is enabled, providing the possibility to handle the acquired point cloud data more efficiently and preferably in real-time. In some embodiments, the processor of the encoder and the processor of the decoder are the same in structure. In some embodiments, the memory storage device of the encoder and the memory storage device of the decoder are the same in structure. In some embodiments, the processor of the encoder and/or decoder are configured to further process or evaluate the point cloud even more preferably in real-time. In particular, for the example of autonomous driving, evaluation of the point cloud could include determination of obstacles in the direction of driving.

Figure 11:
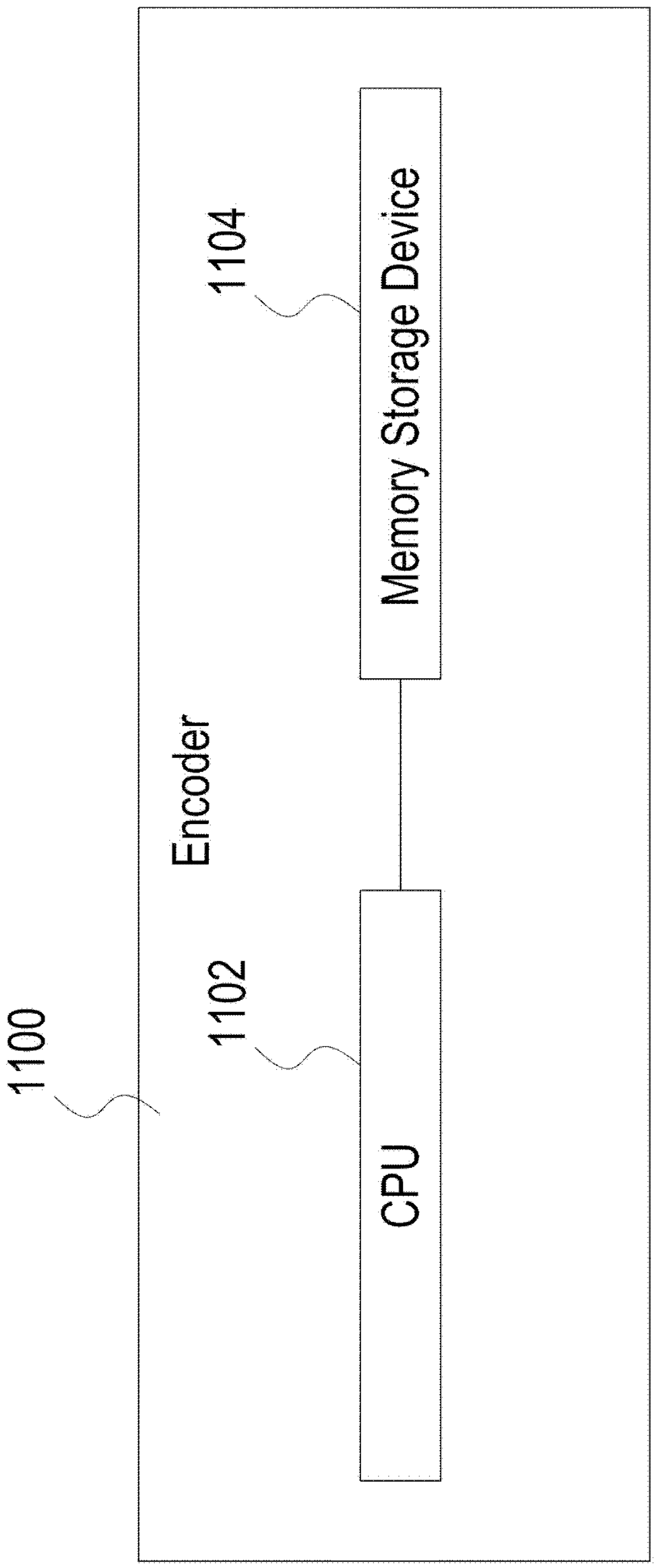
FIG. 11 is a schematic diagram of an encoder device according to an embodiment.

Reference is now made to FIG. 11, which shows a simplified block diagram of an example embodiment of an encoder 1100. The encoder 1100 includes a processor 1102 and a memory storage device 1104. The memory storage device 1104 may store a computer program or application containing instructions that, when executed, cause the processor 1102 to perform operations such as those described herein. For example, the instructions may encode and output bitstreams encoded in accordance with the methods described herein. It will be understood that the instructions may be stored on a non-transitory computer-readable medium, such as a compact disc, flash memory device, random access memory, hard drive, etc. When the instructions are executed, the processor 1102 carries out the operations and functions specified in the instructions so as to operate as a special-purpose processor that implements the described process(es). Such a processor may be referred to as a "processor circuit" or "processor circuitry" in some examples.

Figure 12:
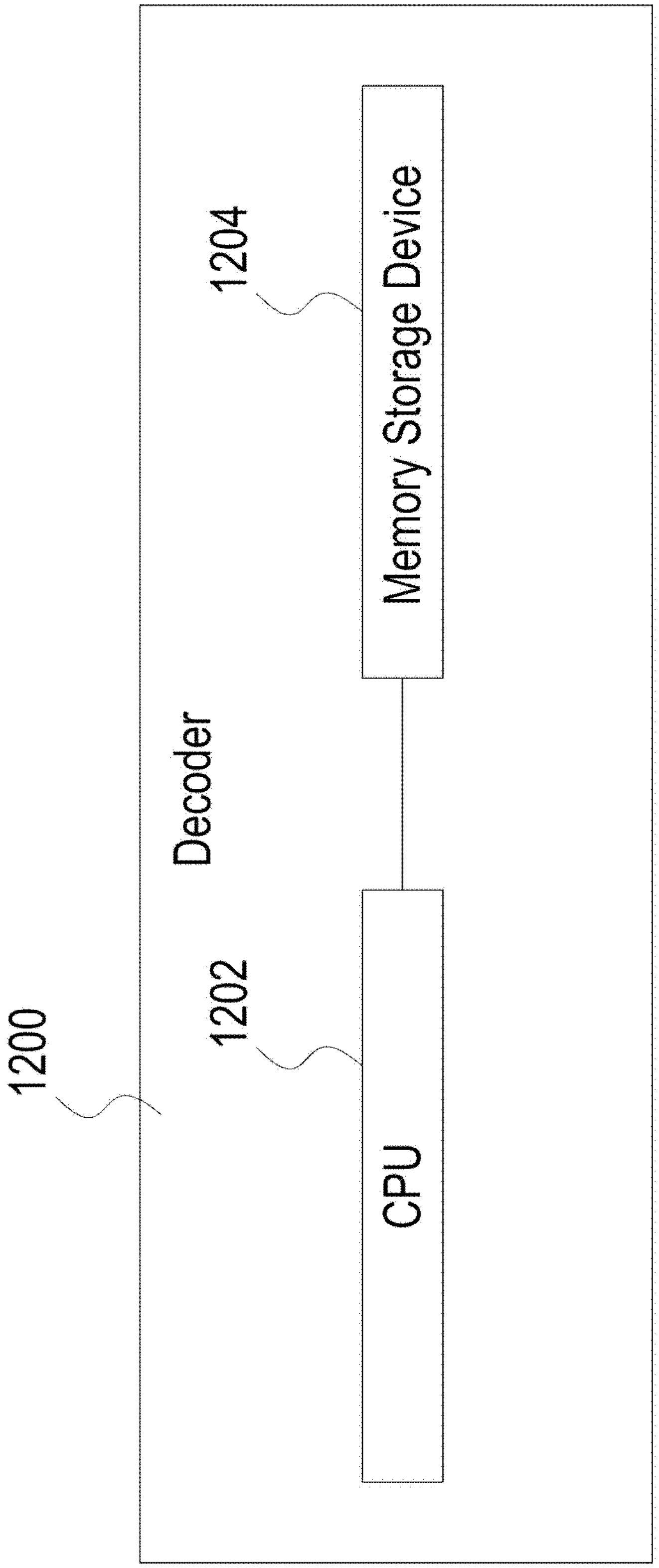
FIG. 12 is a schematic diagram of a decoder device according to an embodiment.

Reference is now also made to FIG. 12, which shows a simplified block diagram of an example embodiment of a decoder 1200. The decoder 1200 includes a processor 1202 and a memory storage device 1204. The memory storage device 1204 may include a computer program or application containing instructions that, when executed, cause the processor 1202 to perform operations such as those described herein. It will be understood that the instructions may be stored on a computer-readable medium, such as a compact disc, flash memory device, random access memory, hard drive, etc. When the instructions are executed, the processor 1202 carries out the operations and functions specified in the instructions so as to operate as a special-purpose processor that implements the described process(es) and methods. Such a processor may be referred to as a "processor circuit" or "processor circuitry" in some examples.

It will be appreciated that the decoder and/or encoder according to the present application may be implemented in a number of computing devices, including, without limitation, servers, suitably programmed general purpose computers, machine vision systems, and mobile devices. The decoder or encoder may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the decoder and/or encoder described herein and the module, routine, process, thread, or other software component implementing the described method/process for configuring the encoder or decoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

The present application also provides for a computer-readable signal encoding the data produced through application of an encoding process in accordance with the present application.

Certain adaptations and modifications of the described embodiments can be made. Therefore, the above discussed embodiments are considered to be illustrative and not restrictive. In particular, embodiments can be freely combined with each other.

The invention claimed is:

1. A method for encoding a point cloud to generate a bitstream of compressed point cloud data, wherein the point cloud's geometry is represented by an octree-based structure with a plurality of nodes having parent-child relationships by recursively splitting a volumetric space containing the point cloud into sub-volumes each associated with a node of the octree-based structure, the method comprising:

determining eligibility of planar mode for a present node to be encoded for at least two directions;

in the case of eligibility of planar mode in at least two directions of the present node, determining one planar flag indicating planar context information for the at least two directions; and entropy encoding occupancy of the present node based on the determined planar context information to produce encoded data for the bitstream, wherein in the case of eligibility of planar mode in the at least two directions and child nodes of the present node forming planes in the at least two directions, one planar flag is encoded indicating planar context information for the at least two directions.

2. A method for decoding a bitstream of compressed point cloud data to generate a reconstructed point cloud, wherein the point cloud's geometry is represented by an octree-based structure with a plurality of nodes having parent-child relationships by recursively splitting a volumetric space containing the point cloud into sub-volumes each associated with a node of the octree-bases structure, the method comprising:

determining eligibility of planar mode for a present node to be decoded for at least two directions;

in the case of eligibility of planar mode in at least two directions of the present node, decoding one planar flag indicating planar context information for the at least two directions; and entropy decoding the bitstream based on the determined planar context information of the present node to reconstruct occupancy of the present node, wherein in the case of eligibility of planar mode in the at least two directions and child nodes of the present node forming planes in the at least two directions, one planar flag is decoded indicating planar context information for the at least two directions.

3. The method according to claim 1, wherein in the case of eligibility of planar mode in the at least two directions and child nodes of the present node form planes in two or less directions, at least two additional unitary direction planar flags are encoded, wherein each unitary direction planar flag indicates presence of a plane in one direction.

4. The method according to claim 3, wherein, in case that the at least two additional unitary direction planar flags indicate absence of a plane for at least one of the two respective directions, a third unitary direction planar flag indicating presence of a plane in a third direction is encoded.

5. The method according to claim 1, wherein in the case of eligibility of planar mode in two directions and child nodes of the present node forming planes in the respective two directions, one planar flag is encoded indicating planar context information for the two directions.

6. The method according to claim 1, wherein in the case of eligibility of planar mode in two directions, wherein child nodes of the present node form a plane in a first direction of the two directions, at least one additional unitary direction planar flag is encoded, wherein each unitary direction planar flag indicates presence of a plane in one direction.

7. The method according to claim 6, wherein, in case that the at least one additional unitary direction planar flag indicates absence of a plane for the first direction of the two directions, a second unitary direction planar flag indicating presence of a plane in a second direction of the two directions is encoded.

8. The method according to claim 1, wherein the bitstream is an MPEG G-PCC compliant bitstream.

9. An encoder for encoding a point cloud to generate a bitstream of compressed point cloud data, wherein the point cloud's geometry is represented by an octree-based structure with a plurality of nodes having parent-child relationships by recursively splitting a volumetric space containing the point cloud into sub-volumes each associated with a node of the octree-based structure, the encoder comprising:

a processor and a memory storage device, wherein in the memory storage device instructions executable by the processor are stored that, when executed, cause the processor to:

determine eligibility of planar mode for a present node to be encoded for at least two directions;

in the case of eligibility of planar mode in at least two directions of the present node, determine one planar flag indicating planar context information for the at least two directions; and entropy encode occupancy of the present node based on the determined planar context information to produce encoded data for the bitstream, wherein in the case of eligibility of planar mode in the at least two directions and child nodes of the present node forming planes in the at least two directions, one planar flag is encoded indicating planar context information for the at least two directions.

10. A decoder for decoding a bitstream of compressed point cloud data to generate a reconstructed point cloud, wherein the point cloud's geometry is represented by an octree-based structure with a plurality of nodes having parent-child relationships by recursively splitting a volumetric space containing the point cloud into sub-volumes each associated with a node of the octree-bases structure, the decoder comprising:

a processor and a memory storage device, wherein in the memory storage device instructions executable by the processor are stored that, when executed, cause the processor to perform the method according to claim 2.

11. A non-transitory computer-readable storage medium storing processor-executed instructions that, when executed by a processor, cause the processor to perform the method according to claim 1.

12. The method according to claim 2, wherein in the case of eligibility of planar mode in the at least two directions and child nodes of the present node form planes in two or less directions, at least two additional unitary direction planar flags are decoded, wherein each unitary direction planar flag indicates presence of a plane in one direction.

13. The method according to claim 12, wherein, in case that the at least two additional unitary direction planar flags indicate absence of a plane for at least one of the two respective directions, a third unitary direction planar flag indicating presence of a plane in a third direction is decoded.

14. The method according to claim 2, wherein in the case of eligibility of planar mode in two directions and child nodes of the present node forming planes in the respective two directions, one planar flag is decoded indicating planar context information for the two directions.

15. The method according to claim 2, wherein in the case of eligibility of planar mode in two directions, wherein child nodes of the present node form a plane in a first direction of the two directions, at least one additional unitary direction planar flag is decoded, wherein each unitary direction planar flag indicates presence of a plane in one direction.

16. The method according to claim 15, wherein, in case that the at least one additional unitary direction planar flag indicates absence of a plane for the first direction of the two directions, a second unitary direction planar flag indicating presence of a plane in a second direction of the two directions is decoded.

17. The method according to claim 2, wherein the bitstream is an MPEG G-PCC compliant bitstream.

18. The method according to claim 2, wherein determining the eligibility of planar mode for the present node to be decoded for the at least two directions comprises:

determining, for the present node to be decoded and for each of three axes corresponding to X, Y and Z directions of a three-dimensional coordinate system of the point cloud, whether the planar mode is eligible; and wherein decoding one planar flag indicating planar context information for the at least two directions comprises:

identifying a plurality of eligible axes in a case that the planar mode is eligible for at least two of the three axes, wherein the plurality of eligible axes comprise the at least two of the three axes for which the planar mode is eligible; and decoding, when present in the bitstream, a single common planar flag for the plurality of eligible axes, the single common planar flag indicating common planar context information for the plurality of eligible axes, wherein the common planar context information indicates whether positions of occupied child nodes of the present node form a single plane in each of the plurality of eligible axes, wherein in a case that the common planar context information indicates that the single common planar flag has a first value, inferring, without decoding individual direction planar flags for the plurality of eligible axes, that the occupied child nodes form a single plane in each of the plurality of eligible axes; or in a case that the common planar context information indicates that the single common planar flag has a second value, decoding one or more individual direction planar flags for one or more of the plurality of eligible axes, and, in a case that the decoded one or more individual direction planar flags indicate presence of a plane in all but one of the plurality of eligible axes, inferring an individual direction planar flag for a remaining eligible axis as indicating absence of a plane.

19. The method according to claim 18, wherein entropy decoding the bitstream based on the determined planar context information of the present node to reconstruct occupancy of the present node comprises:

entropy decoding occupancy information of the present node based on the decoded single common planar flag to reconstruct occupancy of the present node, in a case that the common planar context information indicates that the single common planar flag has the first value;

entropy decoding occupancy information of the present node based on the decoded single common planar flag and the decoded one or more individual direction planar flags to reconstruct occupancy of the present node, in a case that the common planar context information indicates that the single common planar flag has the second value; or entropy decoding occupancy information of the present node based on the decoded single common planar flag, the decoded one or more individual direction planar flags and the inferred individual direction planar flag to reconstruct occupancy of the present node, in a case that the common planar context information indicates that the single common planar flag has the second value and in a case that the decoded one or more individual direction planar flags indicate presence of a plane in all but one of the plurality of eligible axes.

* * * * *